United States Patent
Hirasawa

(10) Patent No.: US 11,943,134 B2
(45) Date of Patent: Mar. 26, 2024

(54) TRANSFER DEVICE, TRANSFER SYSTEM, TRANSFER METHOD AND PROGRAM

(71) Applicant: Nippon Telegraph and Telephone Corporation, Tokyo (JP)

(72) Inventor: Takayoshi Hirasawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 178 days.

(21) Appl. No.: 17/295,508

(22) PCT Filed: Nov. 18, 2019

(86) PCT No.: PCT/JP2019/045126
§ 371 (c)(1),
(2) Date: May 20, 2021

(87) PCT Pub. No.: WO2020/110810
PCT Pub. Date: Jun. 4, 2020

(65) Prior Publication Data
US 2022/0006729 A1 Jan. 6, 2022

(30) Foreign Application Priority Data
Nov. 30, 2018 (JP) .................. 2018-224476

(51) Int. Cl.
*G06F 15/16* (2006.01)
*H04L 45/28* (2022.01)
*H04L 45/74* (2022.01)

(52) U.S. Cl.
CPC .............. *H04L 45/28* (2013.01); *H04L 45/74* (2013.01)

(58) Field of Classification Search
CPC ....... H04L 45/02; H04L 45/30; H04L 45/302; H04L 45/34; H04L 45/50; H04L 45/58;
(Continued)

(56) References Cited

U.S. PATENT DOCUMENTS 10,659,362 B1 * 5/2020 Sellappa ............... H04L 45/243

FOREIGN PATENT DOCUMENTS

JP 2017-38209 2/2017
WO WO-2015087474 A1 * 6/2015 ............. H04L 12/44

OTHER PUBLICATIONS

Reconfigurable network testbed for evaluation of datacenter topologies; William Clay Moody, Jason Anderson, Kuang-Ching Wange, Amy Apon DIDC '14: Proceedings of the sixth international workshop on Data intensive distributed computing ACM DL Digital Library (Year: 2014) (Year: 2014) (Year: 2014).*

(Continued)

*Primary Examiner* — Oscar A Louie
*Assistant Examiner* — Oluwatosin M Gidado
(74) *Attorney, Agent, or Firm* — Fish & Richardson P.C.

(57) ABSTRACT

In a transfer apparatus 44, an internal routing layer L1 detects a destination address of internal routing information from an internal RIB DB 45*t*, transfers the internal routing information to a transfer apparatus of the detected destination address, and stores the internal routing information or external routing information transferred from another transfer apparatus via internal ports P1 and P2 in an FIB DB 46*t*. An external routing layer L2 stores external routing information transferred from an agent 65 in an external RIB DB 48*t*, stores the stored external routing information in the FIB DB 46*t* of the transfer apparatus to which the external routing layer L2 itself belongs, and transfers the external routing information to another transfer apparatus via the internal ports P1 and P2 such that the external routing information is stored in the FIB DB 46*t*.

6 Claims, 9 Drawing Sheets

(58) Field of Classification Search
CPC ......... H04L 45/28; H04L 45/74; H04L 45/22;
H04L 45/16; H04L 45/18; H04L 45/36;
H04L 45/44; H04L 45/64; H04L 45/645;
H04L 45/655
USPC ........................................................ 709/243
See application file for complete search history.

(56) References Cited

OTHER PUBLICATIONS

Clos, "A Study of Non-Blocking Switching Networks," The Bell System Technical Journal, Mar. 1953, pp. 406-424.
Github.com, [online], "Multi-Service Fabric (MSF)," 2018, retrieved on Jun. 12, 2018, retrieved from URL<https://github.com/multi-service-fabric/msf>, 3 pages.
Guide.opencord.org, [online], "Installing a physical PoD," 2018, retrieved on Apr. 28, 2021, retrieved from URL<https://guide.opencord.org/cord-5.0/install_physical.html>, 14 pages.
Onosproject.org, [online], "Enabling next-generation solutions in service provider networks," 2018, available on or before Nov. 30, 2018, retrieved from URL<https://onosproject.org/>, 1 page.

\* cited by examiner

```
IP TABLE T1

<DESTINATION>  <OUTPUT GROUP>

SWITCH 1      Group : Switch 1    (INTERNAL ROUTING
                                    INFORMATION)
 0.0.0.1       Group : Switch 1    (EXTERNAL ROUTING
                                    INFORMATION)
 0.0.0.2       Group : Switch 1    (EXTERNAL ROUTING
                                    INFORMATION)
   :
   :
 0.0.0.10      Group : Switch 1    (EXTERNAL ROUTING
                                    INFORMATION)
```

```
OUTPUT TABLE T2
                        <OUTPUT
<OUTPUT GROUP>         DESTINATION>

Group: Switch 1           3, 4      (INTERNAL ROUTING
                                     INFORMATION)
```

Fig. 4

```
                        <OUTPUT
<DESTINATION>        DESTINATION>
                                     (INTERNAL
  SWITCH 1              3, 4         ROUTING INFORMATION)
                                     (EXTERNAL
  0.0.0.1               3, 4         ROUTING INFORMATION)
                                     (EXTERNAL
  0.0.0.2               3, 4         ROUTING INFORMATION)
    :
    :
                                     (EXTERNAL
  0.0.0.10              3, 4         ROUTING INFORMATION)
```

Fig. 5

TRANSFER DEVICE, TRANSFER SYSTEM, TRANSFER METHOD AND PROGRAM

CROSS-REFERENCE TO RELATED APPLICATIONS

This application is a National Stage application under 35 U.S.C. § 371 of International Application No. PCT/JP2019/045126, having an International Filing Date of Nov. 18, 2019, which claims priority to Japanese Application Serial No. 2018-224476, filed on Nov. 30, 2018. The disclosure of the prior application is considered part of the disclosure of this application, and is incorporated in its entirety into this application.

TECHNICAL FIELD

The present invention relates to a transfer apparatus, a transfer system, a transfer method, and a program capable of quickly addressing a failure and recovering from the failure when a failure occurs in a communication routing of a transfer apparatus group configuring a wide area network or in a transfer apparatus.

BACKGROUND ART

In recent years, markets for general-purpose switches for data centers (DCs) adapted to general-purpose transfer functions have been growing with the development of Over The Top (OTT). Communication carriers also have examined division of a plurality of combined functions of general-purpose transfer apparatuses (disaggregation of transfer apparatuses) in regard to existing apparatuses dedicatedly developed for the carriers (Patent Literature 1).

FIG. 7 illustrates a configuration of a transfer apparatus 10 in the related art. The transfer apparatus 10 is configured to accommodate, in one package, three functions, namely a management function 10$a$ for controlling the transfer apparatus 10, a routing function 10$b$ for controlling routings connected to other transfer apparatuses, and a packet transfer function 10$c$ for transferring packets.

As illustrated in FIG. 8, fabric cards 13$a$ and 13$b$ controlled by a network operating system (NOS) 12 and line cards 14$a$, 14$b$, and 14$c$ are incorporated in the transfer apparatus 10. These two types of apparatus components, namely the fabric cards 13$a$ and 13$b$ and the line cards 14$a$, 14$b$, and 14$c$ are connected to each other with a Clos-type topology 15.

In the future, an improvement in flexibility of a network scale and cost reduction are expected to be achieved by replacing the packet transfer function 10$c$ with a transfer apparatus group for DC adapted to general transfer functions and causing the management function 10$a$ and the routing function 10$b$ to be implemented in an external server and an external transfer apparatus.

A transfer system in the related art illustrated in FIG. 9 includes the management function 10$a$ accommodated separately in an external server 11 and a group of transfer apparatuses 11$a$, 11$b$, 11$c$, 11$d$, and 11$e$ controlled by the management function 10$a$. Here, each of the transfer apparatuses 11$a$ to 11$e$ includes the packet transfer function 10$c$. Further, either each of the transfer apparatuses 11$a$ to 11$e$ or the server 11 is provided with the routing function 10$b$.

In each of the transfer apparatuses 11$a$ to 11$e$ illustrated in FIG. 9, components illustrated in FIG. 10 are accommodated as follows. The transfer apparatus 11$a$ is a spine switch (SW) 17$a$, the transfer apparatus 11$b$ is a spine SW 17$b$, the transfer apparatus 11$c$ is a leaf SW 18$a$, the transfer apparatus 11$d$ is a leaf SW 18$b$, and the transfer apparatus 11$e$ is a leaf SW 18$c$.

The transfer system illustrated in FIG. 10 is configured such that two types of apparatus components, namely the spine SWs 17$a$ and 17$b$ and the leaf SWs 18$a$, 18$b$, and 18$c$ controlled by a controller (CTL) 16$a$ mounted in the server 16, are connected to each other with Clos-type topology 19. The spine SWs 17$a$ and 17$b$ and the leaf SWs 18$a$ to 18$c$, connected to each other with the Clos-type topology 19 configure a switch cluster 20.

For such transfer apparatuses, a configuration in which a plurality of transfer apparatuses are combined to process traffic has been examined in order to assure a transfer capacity similar to that of general transfer apparatuses. For general transfer apparatuses, the two types of apparatus components, namely fabric cards and line cards, are connected to each other with a Clos-type topology. Implementation of large-capacity transfer has been expected to be achieved by connecting a group of general-purpose apparatuses with similar topologies (Non Patent Literature 1).

In the future, virtual private network (VPN) techniques of a plurality of logical overlay networks on a physical network configured by a group of transfer apparatuses are expected to be achieved in order to efficiently accommodate networks with different requirements such as 5th generation (5G).

In examination of disaggregation of transfer apparatuses, there are an autonomous decentralized-type architecture (Non Patent Literature 2) and a centralized control-type architecture (Non Patent Literature 3 and 4) as existing architectures for controlling a group of a plurality of general-purpose apparatuses. FIG. 11 illustrates an autonomous decentralized-type transfer system 21, and FIG. 12 illustrates a centralized control-type transfer system 31.

The autonomous decentralized-type transfer system 21 illustrated in FIG. 11 is configured to include an external server 22 in which a management CTL 22$a$ is mounted as a control function and a group of transfer apparatuses 24$a$ to 24$e$ controlled by the management CTL 22$a$ via a management SW 23.

Each of the transfer apparatuses 24$a$ to 24$e$ includes a routing information base (RIB) construction function 25 and a forwarding information base (FIB) construction function 26 as NOSs for realizing a routing function and a packet transfer function.

The RIB construction function 25 is in charge of the routing function, exchanges routing information of packets with other transfer apparatuses via predetermined routings, and stores the routing information in an RIB data base (also referred to as a RIB DB).

The FIB construction function 26 is in charge of the packet transfer function, obtains packet transfer information on the basis of the routing information in the RIB DB, and stores the packet transfer information in a FIB data base (also referred to as an FIB DB).

In this manner, NOSs for the RIB construction function 25 and the FIB construction function 26 that are autonomous routing solving functions are implemented in each of the transfer apparatuses 24$a$ to 24$e$ in the autonomous decentralized-type transfer system 21. The disposition of the NOSs enables the NOSs themselves of each of the transfer apparatuses 24$a$ to 24$e$ to autonomously construct routings even in a case in which connection to the management CTL 22$a$ is disconnected. There is thus an advantage that reliability of the communication network can be maintained.

A centralized control-type transfer system 31 illustrated in FIG. 12 is configured to include an external server 32 and a group of transfer apparatuses 34a to 34e connected to the external server 32 via a management SW 33. The external server 32 includes a management function 32a, an RIB construction function 32b, and an FIB construction function 32c. The management function 32a performs routing/forwarding (R/F) control in conjunction with the RIB construction function 32b and the FIB construction function 32c and controls (also referred to as management control) the group of transfer apparatus 34a to 34e via the management SW 33.

The centralized control-type transfer system 31 centrally performs routing construction for the plurality of transfer apparatuses 34a to 34e through management control performed using the management function 32a of the externally separated server 32. Thus, there is an advantage that the transfer apparatuses can be controlled as logical nodes without taking into consideration the number of physical transfer apparatuses when the routing information is exchanged.

CITATION LIST

Patent Literature

Patent Literature 1: JP 2017-38209 A

Non Patent Literature

Non Patent Literature 1: C. Clos, "A Study of Non-Blocking Switching Networks." The Bell System technical Journal, 32(2): 406 to 424, March 1953.
Non Patent Literature 2: "Multi-Service Fabric (MSF)", [online], 2018 GitHub, Inc, [Search on Nov. 9, 2018], Internet <URL: https://github.com/multi-service-fabric/msf>
Non Patent Literature 3: ONF, "Enabling next-generation solutions in service provider networks", [online], 2018, [Search on Nov. 9, 2018], Internet <URL: https://onosproject.org>
Non Patent Literature 4: ONF, "CORD Installing a physical PoD", [online], 2018, [Search on Nov. 9, 2018], Internet <URL: https://guide.opencord.org/cord-5.0/install_physical.html>

SUMMARY OF THE INVENTION

Technical Problem

It is assumed that in the aforementioned autonomous decentralized-type transfer system 21 (FIG. 11) according to Non Patent Literature 2, the amount of routing information increases with an increase in number of physical transfer apparatuses 24a to 24e and compatibility with an existing network is degraded due to network design change. In this case, the amount of routing recalculation and the amount of routing information rewritten in an FIB DB in each of transfer apparatuses increase as the number of transfer apparatuses and the amount of routing information increase at the time of a failure in the transfer apparatuses 24a to 24e or in a connection routing therebetween. Thus, there is a problem in that a failure causes a long disconnection time, in other words, a long rerouting time.

In the centralized control-type transfer system 31 (FIG. 12) according to Non Patent Literature 3, a load for rerouting for each of the transfer apparatuses 34a to 34e is centralized at the external server 42 at the time of a failure in the transfer apparatuses 34a to 34e or in a connection routing therebetween. Thus, there is a problem in that the amount of calculation load and a rerouting time for solving the failure increase as the number of transfer apparatuses and the amount of routing information increase.

The present invention has been made in view of such circumstances, and an object thereof is to provide a transfer apparatus, a transfer system, a transfer method, and a program capable of reducing an amount of calculation load and a rerouting time for solving a failure at the time of a failure in a connection routing between transfer apparatuses or in a transfer apparatus.

Means for Solving the Problem

As a means for solving the aforementioned problem, the present invention according to a first aspect provides a transfer apparatus including an external control unit configured to centrally control a transfer apparatus group connected to each other with communication routings in accordance with external routing information notified from an external communication apparatus outside the transfer apparatus group and an internal control unit configured to perform autonomous decentralized control for autonomously constructing a routing for each of the transfer apparatuses in accordance with internal routing information exchanged only between the transfer apparatuses in the transfer apparatus group, the transfer apparatus further including: a first data base (DB) configured to store a destination address obtained by resolving, by the internal control unit, the internal routing information through the autonomous decentralized control; a second DB configured to store the external routing information; a transfer function unit that configured to include an external port to which the external routing information is input and an internal port to and from which the internal routing information is input and output to transfer the transfer function unit transferring the external routing information input from the external port and the internal routing information to another transfer apparatus via the internal port, and include a third DB configured to store external routing information or internal routing information transferred from another transfer apparatus; and an agent unit configured to acquire, from the first DB, a destination address of the external routing information input from the external port and transfers the external routing information from the internal port to the transfer apparatus of the acquired destination address, in which the internal control unit performs control of detecting a destination address of the internal routing information from the first DB, transferring the internal routing information to a transfer apparatus of the detected destination address, and storing, in the third DB, the internal routing information or the external routing information transferred from another transfer apparatus via the internal port, and the external control unit performs control of storing the external routing information transferred from the agent unit in the second DB, storing the stored external routing information in the third DB of the transfer apparatus to which the external control unit itself belongs, and transferring the external routing information to another transfer apparatus via the internal port.

The invention according to a seventh aspect provides a transfer method performed by a transfer apparatus including an external control unit configured to centrally control a transfer apparatus group connected to each other with communication routings in accordance with external routing information notified from an external communication apparatus outside the transfer apparatus group and an internal control unit configured to perform autonomous decentralized control for autonomously constructing a routing for each of the transfer apparatuses in accordance with internal routing information exchanged only between the transfer apparatuses in the transfer apparatus group, the transfer apparatus including a first DB configured to store a destination address obtained by resolving, by the internal control unit, the internal routing information through autonomous decentralized control, a second DB configured to store the external routing information, a transfer function unit configured to include a third DB configured to store the external routing information or the internal routing information transferred from another transfer apparatus, and an agent unit, the transfer method including: transferring, by the transfer function unit, the external routing information input from an external port and the internal routing information to another transfer apparatus via an internal port, the transfer function unit including the external port to which the external routing information is input and the internal port to and from which the internal routing information is input and output; by the agent unit, acquiring, from the first DB, a destination address of the external routing information input from the external port and transferring the external routing information from the internal port to the transfer apparatus of the acquired destination address; performing, by the internal control unit control of detecting a destination address of the internal routing information from the first DB, transferring the internal routing information to the transfer apparatus of the detected destination address, and storing, in the third DB, the internal routing information or the external routing information transferred from another transfer apparatus via the internal port: and performing, by the external control unit control of storing the external routing information transferred from the agent unit in the second DB, storing the stored external routing information in the third DB of the transfer apparatus to which the external control unit itself belongs, and transferring the external routing information to another transfer apparatus via the internal port.

According to the configuration of the first aspect and the method of the seventh aspect, it is possible to individually process the internal routing information exchanged only between the transfer apparatuses and the external routing information input from the external port. During the processing, the external routing information can be transferred to the external control unit and can be stored in the second DB using the destination address obtained by resolving, by the internal control unit, the internal routing information in an autonomously decentralized manner (detecting the destination address) and stored in the first DB. Also, the destination address stored in the first DB is stored in the third DB. Further, the external routing information stored in the second DB can be stored by the external control unit in the third DB of the transfer apparatus to which the external control unit itself belongs and can be transferred such that the external routing information is stored in the third DBs in another transfer apparatus.

Thus, it is possible to transfer the external routing information input from the external port to the external control unit that centrally controls the transfer apparatus group using the destination address resolved by the internal control unit in an autonomously decentralized manner. Thus, because the internal routing can be resolved by the internal control unit in an autonomously decentralized manner at the time of a failure in the internal routing or the transfer apparatuses related to the internal routing information of the transfer apparatus group, the transferring of the external routing information to the destination address is not affected. Further, because the external control unit resolves the transferred external routing information in a centralized control manner, causes the transfer apparatus, to which the external control unit itself belongs, and another transfer apparatus to store the external routing information, and can transfer the external routing information without being related to the internal routings or apparatuses, transfer processing is not affected by the failure. Thus, it is possible to reduce the amount of calculation load and a rerouting time for solving a failure at the time of a failure in the connection routings between the transfer apparatuses or in the transfer apparatuses.

According to the invention of a second aspect, the third DB individually stores, as destinations, a destination address of the transfer apparatus related to the internal routing information and a destination address of the external communication apparatus related to the external routing information and stores first information in which a parameter associated with each of the destinations is stored and second information in which a destination address of the transfer apparatus that is an output destination related to the internal routing information is stored, the destination address being associated with the parameter, in the transfer apparatus according to the first aspect.

With this configuration, in a case in which a failure has occurred in an internal routing between the transfer apparatuses or in a transfer apparatus, it is not possible to perform transferring via the internal routing or the transfer apparatus in which the failure has occurred, and it is thus only necessary to delete, in a second table, the destination address of the transfer apparatus, via which transferring cannot be performed, the transfer apparatus being an output destination. Deletion of the internal routing or the transfer apparatus in which the failure has occurred can be reflected in the second table through this simple rewriting processing. In other words, it is possible to easily reflect a failure in a data table at the time of a failure in an internal routing or in a transfer apparatus.

According to the invention of a third aspect, the internal control unit includes the first DB, an internal RIB construction unit configured to perform resolution for detecting a destination address to transfer the internal routing information to be exchanged between the transfer apparatuses and stores, in the first DB, the internal routing information with which the destination address obtained through the resolution is associated, and an internal FIB construction unit configured to read the internal routing information, which is stored in the first DB and with which the destination address is associated, and stores the internal routing information in the third DB, and the external control unit includes the second DB, an external RIB construction unit configured to perform resolution for detecting a destination address outside the transfer apparatus group related to the external routing information and a destination address inside the transfer apparatus group related to the internal routing information and stores, in the second DB, the external routing information with which all the destination addresses obtained through the resolution are associated when the external routing information is notified from the agent unit, and an external FIB construction unit configured to read the external routing information, which is stored in the second DB and with which the destination addresses are associated, stores the read external routing information in the third DB, and transfers the external routing information such that the external routing information is stored in the third DB of the other transfer apparatus, in the transfer apparatus according to the first aspect or the second aspect.

With this configuration, the internal control unit includes the first DB, the internal RIB construction unit, and the internal FIB construction unit. Also, the external control unit includes the second DB, the external RIB construction unit, and the external FIB construction unit. It is thus possible to integrate each of the internal control unit and the external control unit in one unit.

According to the invention of a fourth aspect, the external control unit is implemented in any one of the transfer apparatuses in the transfer apparatus group and is also implemented as a backup in any one of the transfer apparatuses other than the transfer apparatus in which the external control unit is implemented, in the transfer apparatus according to any one of aspects from the first aspect to the third aspect.

With this configuration, it is possible to activate the external control unit as a backup when a failure occurs in the transfer apparatus in which the external control unit is activated or in the internal routing related to the transfer apparatus. It is thus possible to avoid a single point of failure in an aggregated connection portion of the transfer apparatus group.

The invention according to a fifth aspect provides a transfer system including: a transfer apparatus group, in which the transfer apparatuses according to any one of aspects from the first aspect to the fourth aspect are connected to each other; and an external server configured to be connected to the external control unit implemented in one transfer apparatus of the transfer apparatus group and centrally perform centralized control of the transfer apparatus group via the external control unit.

With this configuration, it is possible to centrally perform control such as routing construction of the transfer apparatus group through centralized control performed by the external server, thereby to resolve the routing information without taking into consideration the number of transfer apparatuses, and to perform routing at the time of a failure in an internal routing or a transfer apparatus.

According to the invention of a sixth aspect, the external control unit is provided in the external server instead of the transfer apparatus, in the transfer system according to the fifth aspect.

With this configuration, if the external routing information input from the external port of the transfer apparatus is input to the external control unit of the external server, then the external control unit can transfer the input external routing information to the transfer apparatus of the destination address related to the internal routing information of the transfer apparatus group and the external communication apparatus of the destination address related to the external routing information.

The invention according to an eighth aspect provides a program that causes a computer as a routing information transfer apparatus to operate as: an external control section configured to centrally control a transfer apparatus group connected to each other with communication routings in accordance with external routing information notified from an external communication apparatus outside the transfer apparatus group: an internal control section configured to perform autonomous decentralized control for autonomously constructing a routing for each of the transfer apparatuses in accordance with internal routing information exchanged only between the transfer apparatuses in the transfer apparatus group, a first storage section configured to store a destination address obtained by resolving, by the internal control section, the internal routing information through the autonomous decentralized control: a second storage section configured to store the external routing information: a transfer function section configured to include an external port to which the external routing information is input and an internal port to and from which the internal routing information is input and output to transfer the external routing information input from the external port and the internal routing information to another transfer apparatus via the internal port, and include a third storage section configured to store external routing information or internal routing information transferred from another transfer apparatus; and an agent section configured to acquire, from the first storage section, a destination address of the external routing information input from the external port and transfers the external routing information from the internal port to the transfer apparatus of the acquired destination address, in which the internal control section performs control of detecting a destination address of the internal routing information from the first storage section, transferring the internal routing information to a transfer apparatus of the detected destination address, and storing, in the third storage section, the internal routing information or the external routing information transferred from another transfer apparatus via the internal port, and the external control section performs control of storing the external routing information transferred from the agent section in the second storage section, storing the stored external routing information in the third storage section of the transfer apparatus to which the external control section itself belongs, and transferring the external routing information to another transfer apparatus via the internal port.

According to the program, it is possible to transfer the external routing information input from the external port to the external control unit that centrally controls the transfer apparatus group using the destination address resolved by the internal control unit in an autonomously decentralized manner. Thus, because the internal routing can be resolved by the internal control unit in an autonomously decentralized manner at the time of a failure in the internal routing or the transfer apparatuses related to the internal routing information of the transfer apparatus group, the transferring of the external routing information to the destination address is not affected. Further, because the external control unit can resolve the transferred external routing information in an autonomously decentralized manner and transfer the external routing information to the transfer apparatus, to which the external control unit itself belongs, and another transfer apparatus, the transfer processing is not affected by the failure. Thus, it is possible to reduce the amount of calculation load and a rerouting time for solving a failure at the time of a failure in the connection routing between the transfer apparatuses or in the transfer apparatuses.

Effects of the Invention

According to the present invention, it is possible to provide a transfer apparatus, a transfer system, a transfer method, and a program capable of reducing the amount of calculation load and a rerouting time for solving a failure at the time of a failure in a connection routing between transfer apparatuses or in a transfer apparatus.

BRIEF DESCRIPTION OF DRAWINGS

FIG. 4 is a diagram illustrating routing information in an FIB database in each transfer apparatus in the transfer system according to the embodiment.

FIG. 5 is a diagram illustrating routing information in an FIB database in a transfer apparatus in a transfer system in the related art.

DESCRIPTION OF EMBODIMENTS

Hereinafter, an embodiment of the present invention will be described with reference to the drawings. Here, components with corresponding functions are denoted by the same reference signs throughout all drawings in the specification, and description thereof will be omitted as appropriate.

Configuration of Embodiment

Figure 1:
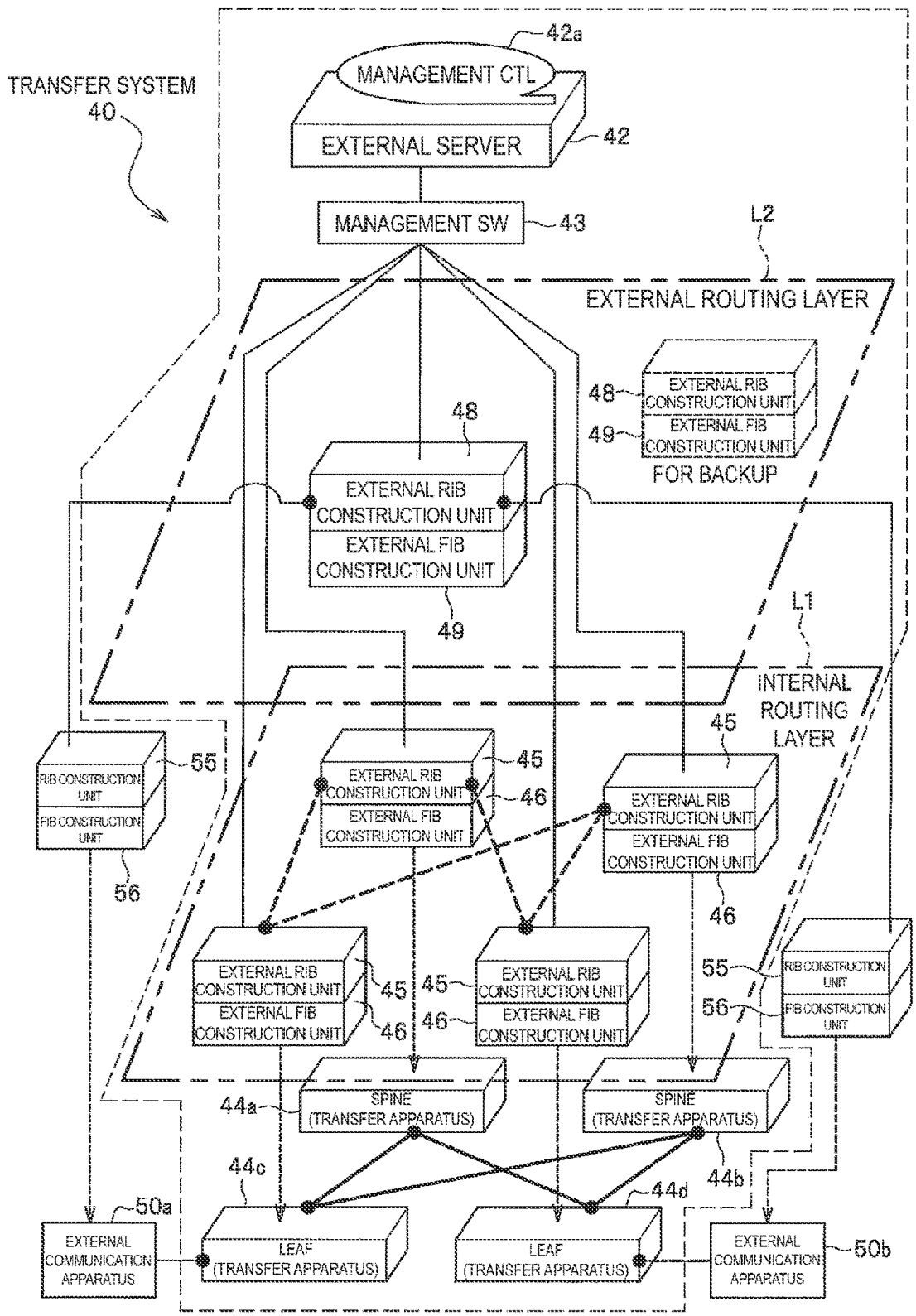
FIG. 1 is a block diagram illustrating a configuration of a transfer system using transfer apparatuses according to an embodiment of the present invention.

FIG. 1 is a block diagram illustrating a configuration of a transfer system using transfer apparatuses according to an embodiment of the present invention.

A transfer system 40 illustrated in FIG. 1 is configured to include an external server 42 in which a management CTL (also referred to as a CTL) 42a that is a control function is mounted and a group of transfer apparatuses 44a to 44d that are internal nodes controlled by the CTL 42a via a management SW 43. External communication apparatuses 50a and 50b such as a router outside the internal nodes are connected to the transfer apparatuses 44c and 44d.

The transfer apparatuses 44a and 44b to which the external communication apparatuses 50a and 50b are not connected are spine SWs controlled by the management CTL 42a and will also be referred to as spines 44a and 44b in this example. The transfer apparatuses 44c and 44d to which the external communication apparatuses 50a and 50b are connected are leaf SWs controlled by the CTL 42a and will also be referred to as leaves 44c and 44d in this example.

Each of the transfer apparatuses 44a to 44d includes an RIB construction unit 45 for internal routing and an FIB construction unit 46 for internal routing, which are NOSs that realize a routing function and a packet transfer function as illustrated in the internal routing layer L1. The RIB construction unit 45 for internal routing will also be referred to as an internal RIB construction unit 45 or an internal RIB 45, and the FIB construction unit 46 for internal routing will also be referred to as an internal FIB construction unit 46 or an internal FIB 46. The internal RIBs 45 are logically connected to each other on software as represented by the dashed lines. Note that the internal routing layer L1 configures the internal control unit according to the aspects.

Also, any one of the transfer apparatuses 44a to 44d includes, as NOSs, an RIB construction unit 48 for external routing and an FIB construction unit 49 for external routing as illustrated in an external routing layer L2. The RIB construction unit 48 for external routing will also be referred to as an external RIB construction unit 48 or an external RIB 48, and the FIB construction unit 49 for external routing will also be referred to as an external FIB construction unit 49 or an external FIB 49. In addition, the external RIB construction unit 48 and the external FIB construction unit 49 are provided as a backup in any one of the transfer apparatuses 44a to 44d in which the external routing layer L2 is not disposed. Note that the external routing layer L2 configures the external control unit described in the aspects.

The internal RIB 45, the internal FIB 46, the external RIB 48, and the external FIB 49 described above are implemented in each of the transfer apparatuses 44a to 44d. However, in FIG. 1, in order to easily identify the units for the internal routing and the units for the external routing, the internal RIB construction unit 45 and the internal FIB construction unit 46 are illustrated in the internal routing layer L1 separately illustrated above the transfer apparatuses 44a to 44d, and the external RIB construction unit 48 and the external FIB construction unit 49 are similarly separately illustrated in the external routing layer L2. The group of transfer apparatuses 44a to 44d with such a configuration will also be referred to as logical nodes.

In addition, each of the external communication apparatuses 50a and 50b also includes an RIB construction unit 55 and an FIB construction unit 56. The RIB construction unit 55 and the FIB construction unit 56 are connected, as an internal routing layer for each of the external communication apparatuses 50a and 50b, to the external RIB 48.

The internal RIB 45 resolves routing to determine a destination (destination address) to which routing information is transferred via communication routing in the logical nodes and stores, in the internal RIB DB 45tc (see FIG. 2), internal routing information with which the destination address obtained through the resolution is associated. In other words, the internal RIB 45 resolves the communication routing in the logical nodes and performs the routing.

The internal FIB 46 reads a routing resolved by the routing, that is, the internal routing information, which is stored in the RIB DB 45tc, with which the destination address is associated, and reflects the internal routing information in the packet transfer function (the transfer units 52a and 52c in FIG. 2) of each of the transfer apparatuses 44a to 44d. In other words, the internal FIB 46 stores the internal routing information, with which the destination address is associated, in the FIB DBs 46ta and 46tc (the third DB or the third storage section) of the transfer units 52a and 52c illustrated in FIG. 2.

Also, the external RIB 48a and the external FIB 49a (see FIG. 2) are implemented in any one of the transfer apparatuses 44a to 44d illustrated in FIG. 1 as described above. The external RIB 48a performs routing for resolving all communication routings related to the transfer destination of the external routing information when the external routing information is notified from the outside of the logical nodes. The external FIB 49a reflects a routing outside the logical nodes that are resolved by the routing in the packet transfer functions (the transfer units 52a and 52c in FIG. 2) of all the transfer apparatuses 44a to 44d in the logical nodes.

The external routing information is information of the routing of the external communication apparatus 50a itself. Also, the external routing information is routing information of routing to an external communication apparatus that is connected to the external communication apparatus (an external router, for example) 50a and are not illustrated in the drawing, that is, routing information detected by the external router 50a.

As described above, the transfer system 40 includes the plurality of transfer apparatuses 44a to 44d in the logical nodes, includes the internal routing layer L1 in each of the transfer apparatuses 44a to 44d, and includes the external routing layer L2 in any one of the transfer apparatuses 44a to 44d. The management CTL 42a of the external server 42 centrally performs configuration control for all the RIB construction units (including internal and external RIB construction units or not including the RIB construction units of the external communication apparatuses) in the transfer system 40 via the management SW 43 (also referred to as an SW 43). Note that the routing control is not performed by the management CTL and is performed by the various RIB construction units in all the apparatuses and services are thus not affected even if a failure occurs in the management CTL.

Figure 2:
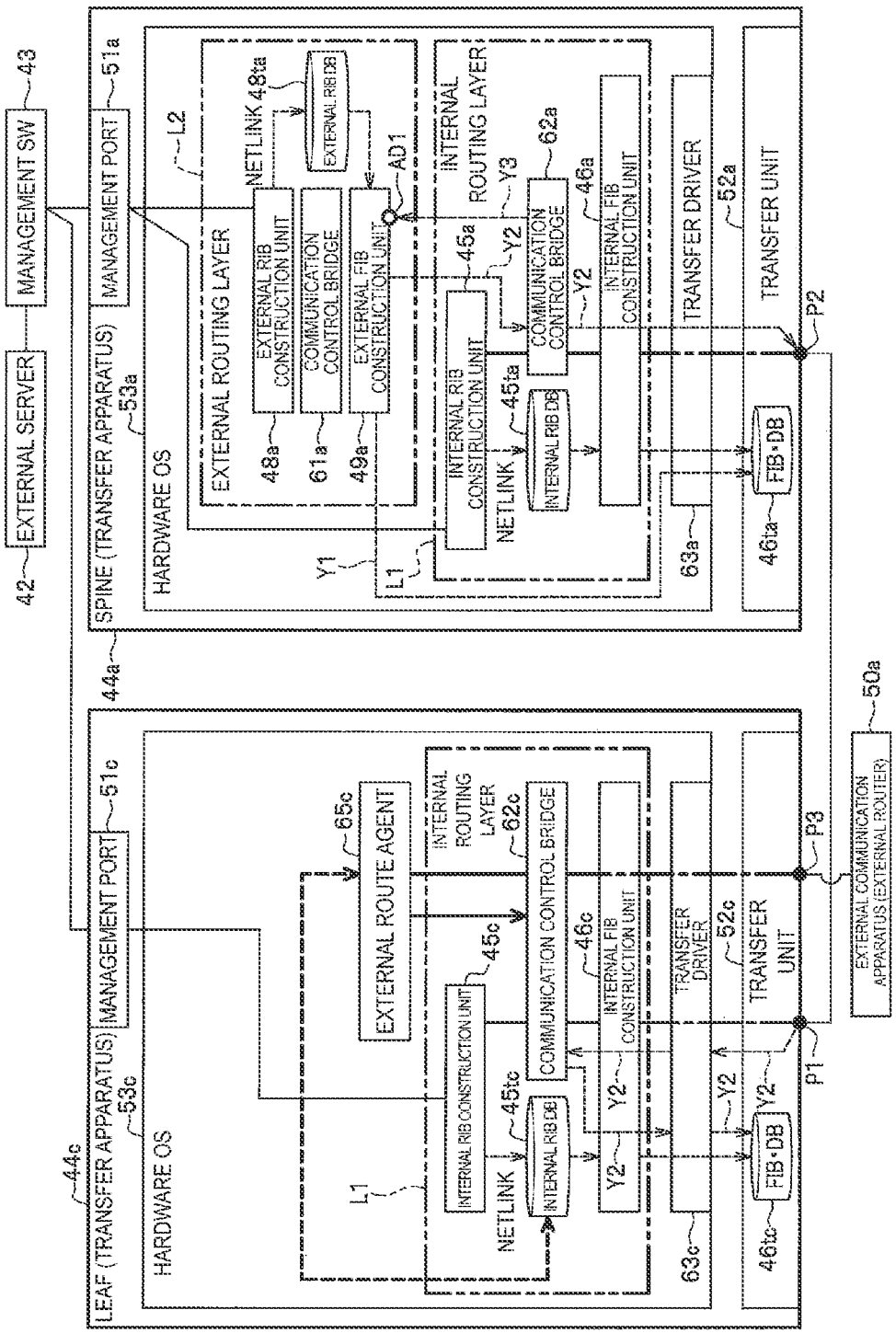
FIG. 2 is a block diagram illustrating configurations of a leaf and a spine in the transfer system according to the embodiment.

FIG. 2 is a block diagram illustrating internal configurations of the leaf 44c and the spine 44a. However, because both the leaves 44c and 44d illustrated in FIG. 1 have the same configuration, and the spines 44a and 44b also have the same configuration, only the leaf 44c and the spine 44a are illustrated in FIG. 2.

The spine 44a is configured to include a management port 51a connected to the SW 43, a transfer unit 52a that realizes high-speed and large-capacity hardware transfer using an application specific integrated circuit (ASIC), and a hardware OS 53a that serves as a calculation processing function with which software processing is performed by a central processing unit (CPU). An FIB DB 46ta is implemented in the transfer unit 52a.

The hardware OS 53a includes an external RIB construction unit 48a on the external routing layer L2, an external RIB DB 48ta, an external FIB construction unit 49a, and a communication control bridge (also referred to as a bridge) 61a. The external RIB 48a and the external FIB 49a are connected to each other via the bridge 61a using a virtual SW. Note that the external RIB DB 48ta may be implemented outside the external routing layer L2 and configures the second DB or the second storage section described in the aspects.

Further, the hardware OS 53a is configured to include an internal RIB construction unit 45a on the internal routing layer L1, an internal RIB DB 45ta, a communication control bridge 62a, an internal FIB construction unit 46a, and a transfer driver 63a. The internal RIB construction unit 45a and the internal FIB construction unit 46a are connected to each other via the bridge 62a using a virtual SW.

In other words, the external RIB 48a, the external FIB 49a, the bridge 61a, the internal RIB 45a, the bridge 62a, the internal FIB 46a, and the transfer driver 63a operate on the hardware OS 53a.

The leaf 44c illustrated in FIG. 2 is configured to include a management port 51c connected to the management SW 43, a transfer unit 52c, and a hardware OS 53c. An FIB DB 46tc is implemented in the transfer unit 52c.

The hardware OS 53c is configured to include an external route agent (also referred to as an agent) 65c, an internal RIB construction unit 45c on the internal routing layer L1, an internal RIB DB 45tc, a communication control bridge 62c, an internal FIB construction unit 46c, and a transfer driver 63c. The internal RIB construction unit 45c and the internal FIB construction unit 46c are connected to each other via the bridge 62c using a virtual SW.

The bridge 62c configures the separation unit that is described in the aspects and separates the internal routing information and the external routing information. The external route agent 65c configures the agent unit described in the aspects. The internal RIB DBs 45ta and 45tc may be implemented outside the internal routing layer L1 and configure the first DBs or the first storage sections described in the aspects.

In other words, the agent 65c, the internal RIB 45c, the communication control bridge 62c, the internal FIB 46c, and the transfer driver 63c operate on the hardware OS 53c.

However, the external RIB 48a and the internal RIB 45a of the spine 44a are connected to the management port 51a. The internal RIB 45c of the leaf 44c is connected to the management port 51c.

Also, although each of the internal RIB 45a, the bridge 62a, the internal FIB 46a, and the transfer driver 63a on the hardware OS 53a of the spine 44a and each of the internal RIB 45c, the communication control bridge 62c, the internal FIB 46c, and the transfer driver 63c on the hardware OS 53c of the leaf 44c are distinguished by applying the reference signs a and c thereto, only one of them will be described below because both have the same function. Note that the transfer units 52a and 52c and the transfer drivers 63a and 63c configure the transfer function units described in the aspects.

Operations in Embodiment

Figure 7:
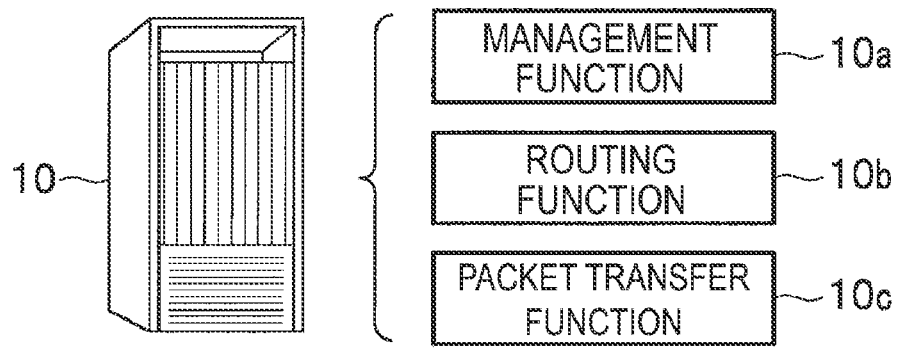
FIG. 7 is a diagram illustrating a configuration of a transfer apparatus in the related art.
Figure 8:
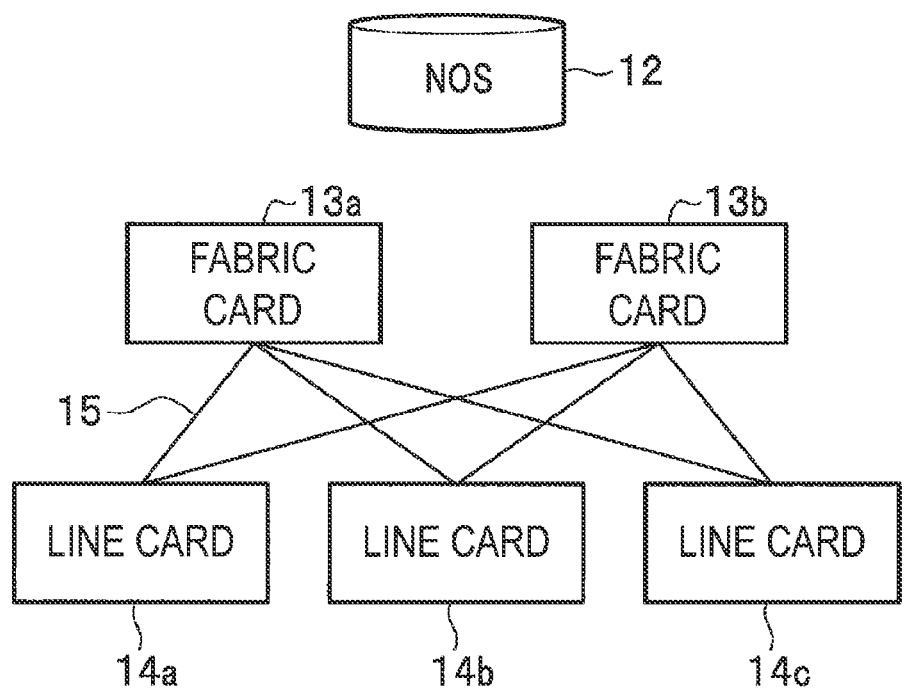
FIG. 8 is a block diagram illustrating a configuration in which fabric cards and line cards that are components accommodated in the transfer apparatus in FIG. 7 are connected to each other with a Clos-type topology in the transfer system in the related art.
Figure 9:
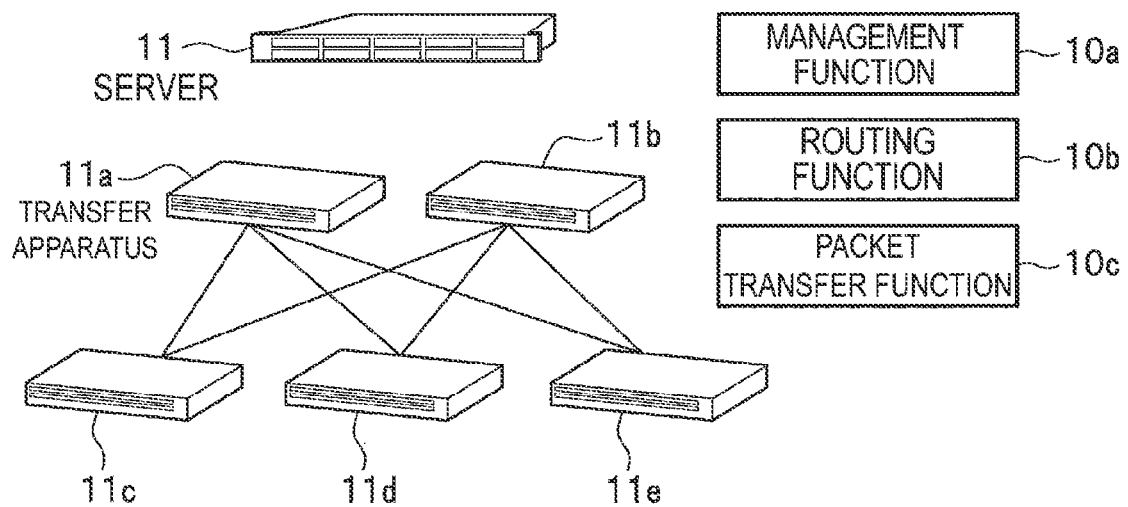
FIG. 9 is a diagram illustrating a configuration of a separated configuration between a switch cluster of a transfer apparatus group and a server outside the switch cluster.
Figure 10:
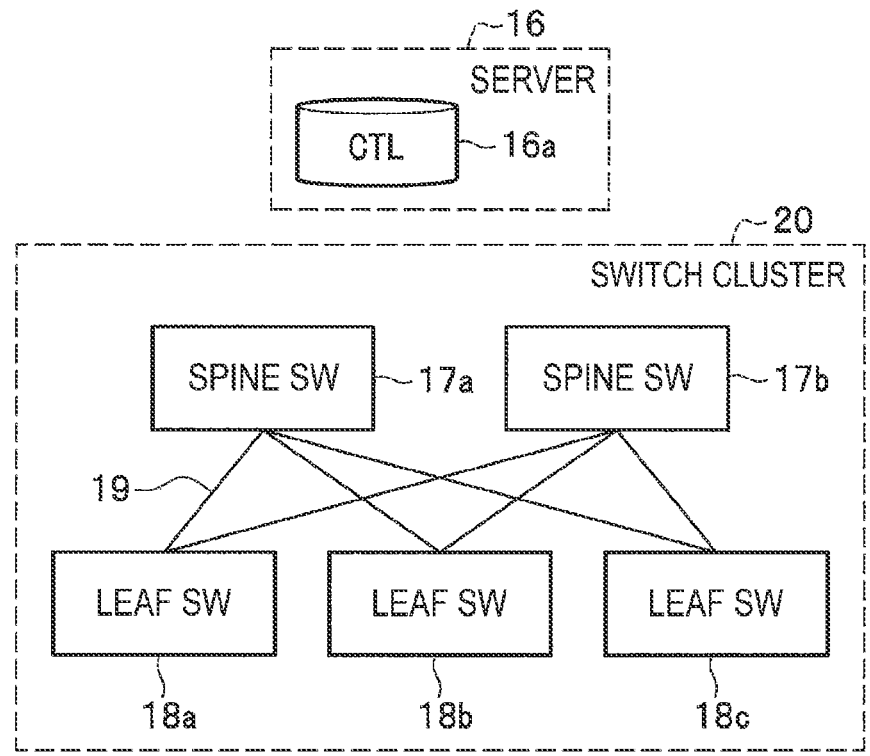
FIG. 10 is a block diagram illustrating a configuration in which spine SWs and leaf SWs that are components accommodated in the transfer apparatus FIG. 9 are connected to each other with a Clos-type topology in the transfer system in the related art.
Figure 11:
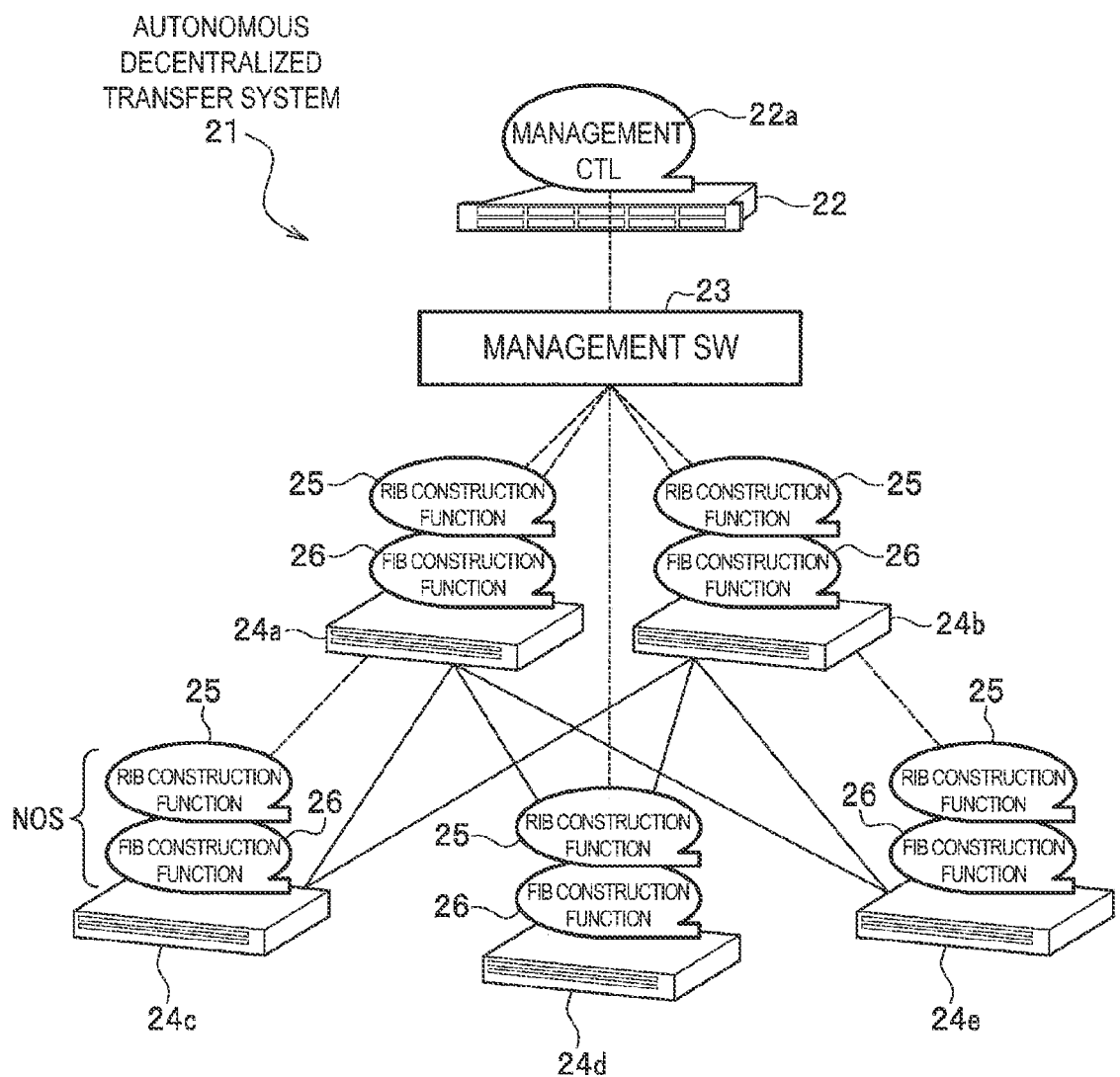
FIG. 11 is a block diagram illustrating a configuration of an autonomous decentralized-type transfer system.
Figure 12:
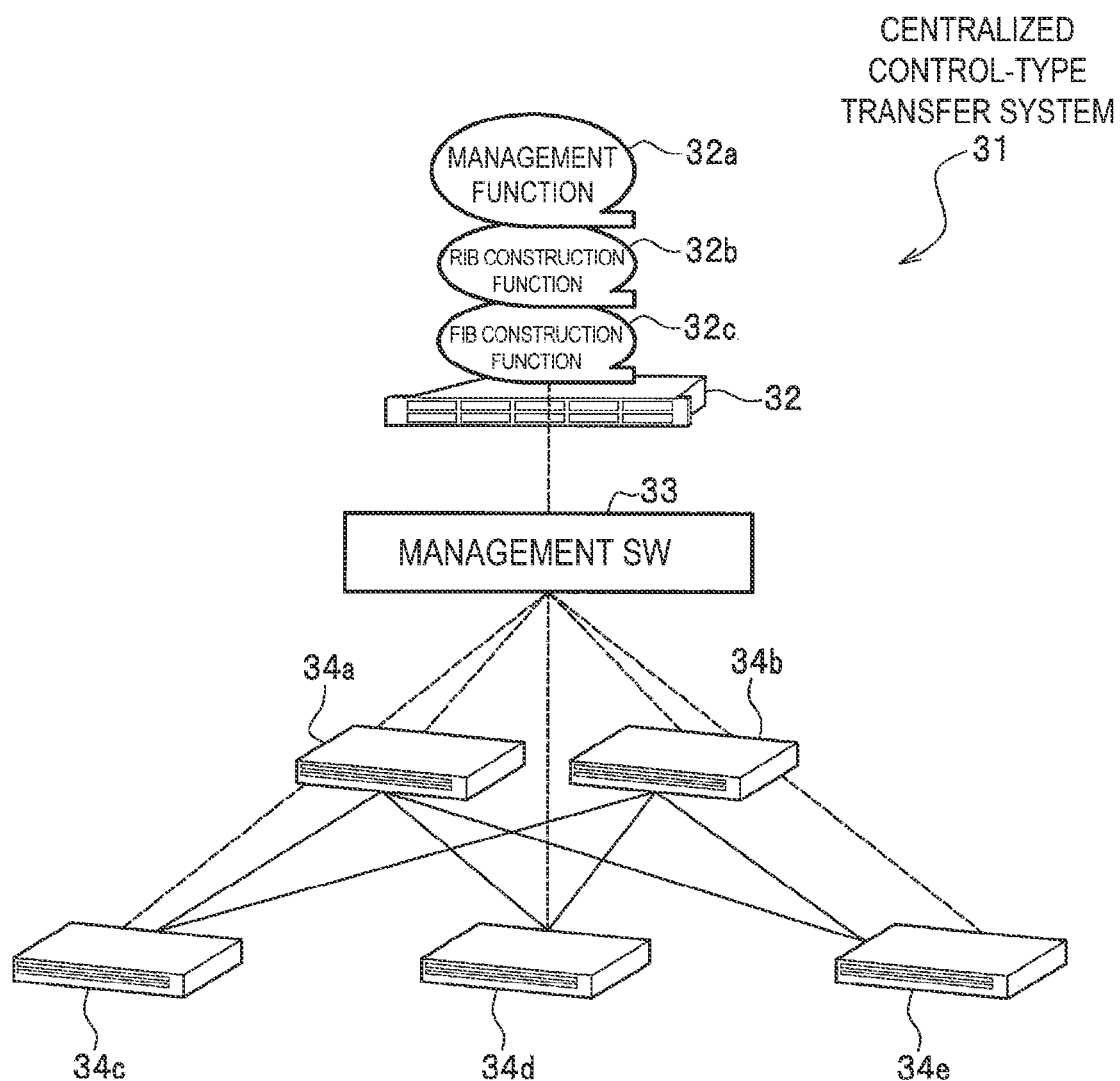
FIG. 12 is a block diagram illustrating a configuration of a centralized control-type transfer system.

It is assumed that in the transfer system 40 with such a configuration, each of the transfer apparatuses 44a to 44d that are controlled as logical nodes illustrated in FIG. 1 are connected to each other as follows as a condition assumed when an operation of addressing a failure in a routing is performed. In other words, a case in which all the transfer apparatuses 44a to 44d illustrated in FIG. 1 are connected with a Clos type that is similar to the connection topology of the fabric cards 13a and 13b and the line cards 14a to 14c mounted in the transfer apparatus 10 (FIG. 7) illustrated in FIG. 8 is assumed. The connection topology may be another topology.

Next, the spines 44a and 44b and the leaves 44c and 44d are defined in the aforementioned connection topology as described above. The leaves 44c and 44d evenly establish connection to all the spines 44a and 44b, and the spines 44a and 44b evenly establish connection to all the leaves 44c and 44d. At this time, ports that establishes connection between each of the leaves 44c and 44d and each of the spines 44a and 44b are internal ports of the logical nodes and are internal ports P1 and P2 of the transfer units 52a and 52c in FIG. 2.

The internal port Pt of the leaf 44c out of the internal ports P1 and P2 will be described as one of the internal ports. The internal port P1 is connected to the internal RIB 45c via the transfer driver 63c connected to the transfer unit 52c, the internal FIB 46c, and the communication control bridge 62c. For this connection, internal routing information using packets is exchanged between the internal RIBs 45c and 45a of the leaf 44c and the spine 44a via the internal ports P1 and P2. The exchange is executed by all the transfer apparatuses 44a to 44d detecting (executed by all the transfer apparatuses 44a to 44d solving) a destination (destination addresses) of an apparatus with which internal routing information is exchanged.

The internal FIBs 46c and 46a write and store the exchanged internal routing information in the internal RIB DBs 45tc and 45ta. The stored internal routing information is read by the internal FIBs 46c and 46a via a netlink and is written and stored in the FIB DBs 46tc and 46ta of the transfer units 52c and 52a. Through the series of processes, storing of the internal routing information of which routing has been resolved in the FIB DBs 46tc and 46ta is completed.

On the other hand, the external RIB 48a and the external FIB 49a are implemented in any one of the transfer apparatuses 44a to 44d (the spine 44a in this example) in the logical nodes. The external RIB 48a and the external FIB 49a are in charge of processing of external routing information input from an external port P3. This processing is triggered by the external routing information input from the external port P3 being notified to the external RIB 48a and the external FIB 49a via an internal routing connected to the internal ports P1 and P2 of the leaf 44c and the spine 44a.

An external router 50a connected to the external port P3 of the leaf 44c and the external RIB 48a of the spine 44a are connected to each other on software. Also, the external RIB 48a and the leaf 44c are connected to each other on hardware via internal ports p1 and p2.

If the external routing information from the external router 50a is input from the external port P3 and is further input to the agent 65c via the bridge 62c, then the agent 65c accesses the internal RIB DB 45tc and acquires a destination address of the external routing information (in this case, the address of the external RIB 48a) as represented by the bidirectional dashed-line arrow. The agent 65c transfers the external routing information to the external RIB 48a in accordance with the acquired destination address. The transfer is performed by the external routing information from the agent 65c being transferred to the external FIB 49a via the internal ports P1 and P2 and being further transferred to the external RIB 48a via the bridge 61a in accordance with the destination address.

The external RIB 48a stores the transferred external routing information in the external RIB DB 48ta via a netlink. The stored external routing information is read by the external FIB 49a and is stored in the FIB DB 46ta of the transfer unit 52a as represented by the dashed-line arrow Y1. Along with the storage, the external FIB 49a outputs the external routing information to the internal port P2 via the bridge 62a as represented by the dashed-line arrow Y2 and transfers the external routing information to the other transfer apparatuses 44b to 44d (which are representatives of the leaf 44c) from the internal port P2.

The transferred external routing information is stored in the FIB DB 46tc of the transfer unit 52c via the internal port P1 of the leaf 44c as follows. In other words, the transfer driver 63c outputs the external routing information input from the internal port P1 to the bridge 62c as represented by the dashed-line arrow Y2, the bridge 62c outputs the external routing information to the transfer driver 63c again, and the transfer driver 63c stores the external routing information in the FIB DB 46tc.

The aforementioned transferring from the agent 65c to the external RIB 48a will be further described. The agent 65c encapsulates once the destination address to which the external routing information from the external port P3 is transferred via an internal routing. This encapsulation is performed by adding internal address information to the external routing information because the external routing information passes through the internal routing. Specifically, the encapsulation is performed by adding, to the head of the external routing information, header information with the destination address of the internal routing. The encapsulation is performed by the following two methods.

The first one is a method of transferring the external routing information directly to the external FIB 49a by the transfer unit 52c of the leaf 44c and the transfer driver 63c that is a driver thereof. In the case of this method, the transfer unit 52c and the transfer driver 63c establish a session directly with the external FIB 49a and then transfer the external routing information to the encapsulated destination. The external FIB 49a that has received the external routing information through the transferring decapsulates the encapsulated information. After the decapsulation, the external FIB 49a transfers the external routing information to the external RIB 48a via the bridge 61a.

In the second method, the external routing information input from the external port P3 is once input from the transfer unit 52c of the leaf 44c to the agent 65c via the transfer driver 63c and the internal FIB 46c through the bridge 62c. The agent 65c encapsulates the external routing information with the destination address of the external routing information to the external FIB 49a and transfers the encapsulated external routing information to the external FIB 49a of the spine 44a as follows.

In other words, the agent 65c performs the encapsulation by adding an internal address AD1 configured on the input side of the external FIB 49a of the spine 44a, the internal address AD1 being detectable from the internal RIB 45c of the leaf 44c. The capsule obtained by the encapsulation is notified from the internal FIB 46a to the bridge 62a via the internal ports P1 and P2. The notified capsule is input from the bridge 62a to the external FIB 49a as represented by the dashed-line arrow Y3, and the encapsulated information is then decapsulated by the external FIB 49a. The external routing information after the decapsulation is transferred to the external RIB 48a via the bridge 61a.

In the embodiment, the second method is employed. The external routing information transferred to the external FIB 49a in this method is stored in the external RIB DB 48ta via a netlink. The stored external routing information is read by the external FIB 49a and is distributed (transferred) to the FIB DB 46ta of the spine 44a and the FIB DB 46tc of the leaf 44c, which is another transfer apparatus, via the dashed-line arrows Y1 and Y2 as described above.

In the case in which the spine 44a includes the external routing layer L2 as illustrated in FIG. 2, the external routing layer L2 for backup is implemented in a transfer apparatus other than the spine 44a, for example, the spine 44b illustrated in FIG. 1. This backup is performed to avoid a single point of failure at an aggregated connection portion of the group of transfer apparatuses 44a to 44d. In other words, a single point of failure is prevented using the external FIB 49 or the like of the backup external routing layer L2 prepared in another spine 44b when a failure occurs in a routing related to the spine 44a.

The processing to be performed when the external routing information input from the external router 50a to the external port P3 as described above is distributed to each of the transfer apparatuses 44a to 44d will be described with reference to FIGS. 3 to 5.

Figure 3:
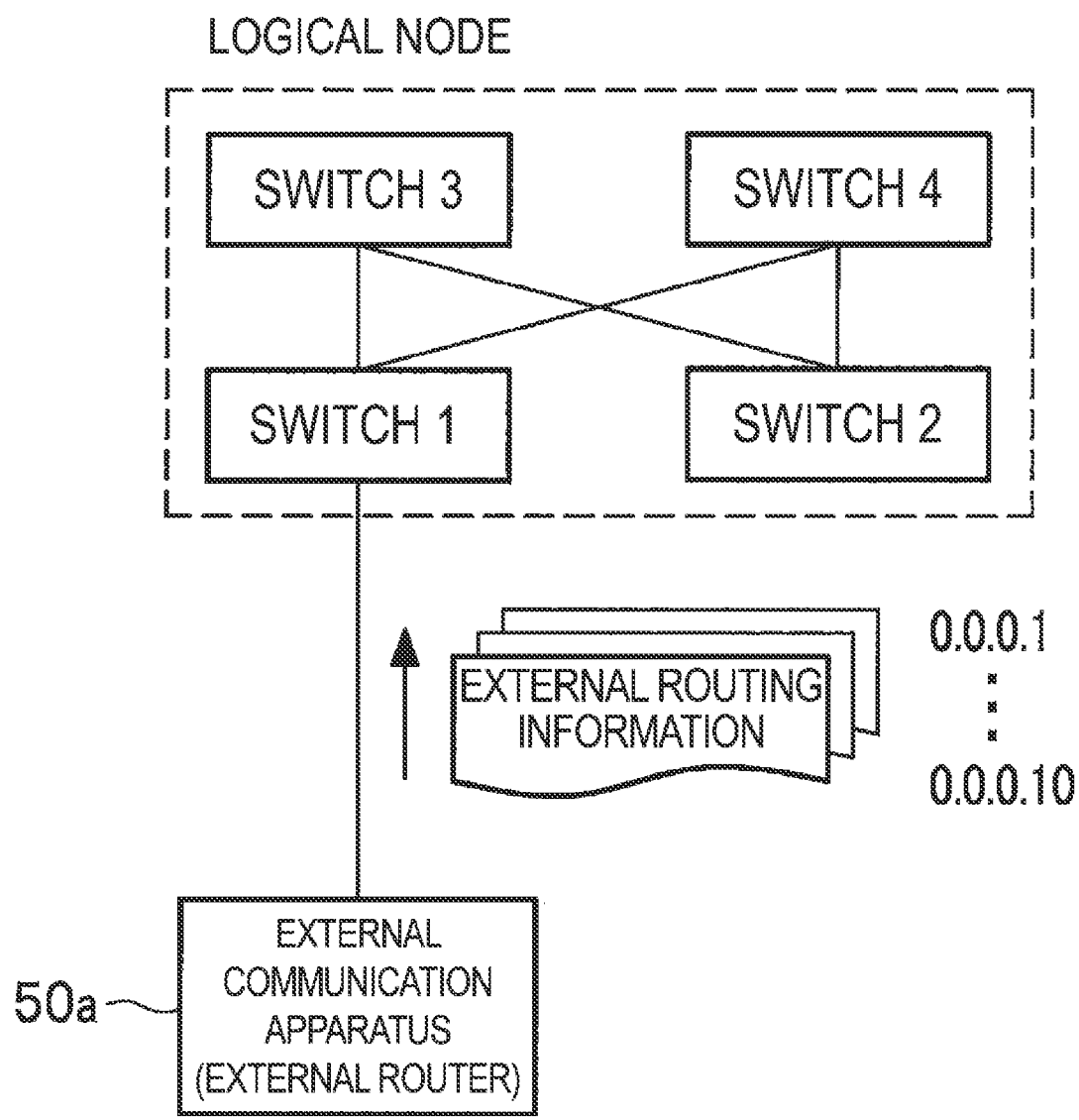
FIG. 3 is a block diagram illustrating a configuration employed when distribution of routing information is performed using a switch in each transfer apparatus in the transfer system according to the embodiment.

FIG. 3 is a block diagram that schematically illustrates the four transfer apparatuses 44a to 44d in the logical nodes as four switches 1, 2, 3, and 4 and illustrates pieces of external routing information, "0.0.0.1", "0.0.0.2", . . . "0.0.0.10", which are input from the external router 50a to the external port (see the external port P3 in FIG. 2) of the switch 1.

In the example, it is assumed that the external routing information input from the switch 1 is transferred to the FIB DB (see the FIB DB 46ta in FIG. 2) in the transfer unit (see the transfer unit 52a in FIG. 2) of the switch 2. The transfer is performed through the routing that reaches the switch 2 from the switch 1 via the switch 3 or 4.

An IP table T1 and an output table T2 are stored in the FIB DB of the switch 2 that is a destination of the external routing information as illustrated in FIG. 4. The IP table T1 includes a <destination> from the switch 2 and an <output group> as parameters associated with each destination. The output table T2 includes an <output group> as parameters and an <output destination> that is a unique number of the transfer apparatus related to the internal routing information associated with the parameters. Note that the IP table T1 configures the first information described in the aspects. The output table T2 configures the second information described in the aspects.

The "switch 1" that is a destination, related to the internal routing information, from the switch 2 and "0.0.0.1", "0.0.0.2", . . . "0.0.0.10" that are destinations outside the group of transfer apparatuses related to the external routing information are stored in the <destination> in the IP table T1. These external destinations "0.0.0.1", "0.0.0.2", . . . "0.0.0.10" are destination addresses on the side of the external router 50a. "Group: Switch1", for example, is stored as a parameter in the <output group>.

"Group. Switch1" that is the same parameter as that in the IP table T1 is stored in the <output group> in the output table T2. The destination addresses "3 and 4" of the switch associated with "Group: Switch1" are stored in the <output destination>.

Referring to each of such tables T1 and T2, in a case in which the internal routing information is transferred from the switch 2 to the destination switch 1, it is only necessary to output the internal routing information to the switch 1 in the <destination> in the IP table T1 and to the switch 3 or 4 in the <output destination> via Group: Switch1 in the <output group>.

Similarly, in a case in which the external routing information is transferred from the switch 2 to the destination "0.0.0.1", it is only necessary to output the external routing information to "0.0.0.1" in the <destination> in the IP table T1 and to the switch 3 or 4 in the <output destination> via Group: Switch1 in the <output group>. The same applies to the following addresses up to the destination "0.0.0.10".

Here, it is assumed that an internal routing between the switch 1 and the switch 4 has been disconnected. Because the switch 4 is not available in this case, "4" in the <output destination> in the output table T2 is deleted, and the output table T2 is rewritten such that only "3" remains. The location to be rewritten is only one location.

On the other hand, a routing information table is stored in the FIB DB of the switch 2 as illustrated in FIG. 5 in the related art. The "switch 1" that is a destination, related to the internal routing information, from the switch 2 and "0.0.0.1", "0.0.0.2", . . . "0.0.0.10" that are external destinations related to the external routing information are stored in the <destination> in the table. The switch "3, 4" of each destination is stored in the <output destination>.

In other words, the output destination 3 or 4 of the internal routing information or the external routing information is associated with each destination in the related art. Specifically, the output destination 3 or 4 is associated with the "switch 1" and each of the ten pieces of external routing information "0.0.0.1", "0.0.0.2", . . . "0.0.0.10".

Thus, in a case in which the routing between the switch 1 and the switch 4 is disconnected, it is necessary to rewrite all the "switch 1" in the <destination> and the ten pieces of external routing information "0.0.0.1". "0.0.0.2", . . . "0.0.0.10" to delete "4" in the <output destination> and leave only "3".

Effects of Embodiment

Effects of the transfer apparatus 44 according to the embodiment will be described. Note that the description will be given with the reference signs a and c illustrated in FIGS. 1 and 2 removed. The transfer apparatuses 44a to 44d will be referred to as a transfer apparatus 44.

The transfer apparatus 44 has the external routing layer L2 that serves as the external control unit that centrally controls the group of transfer apparatuses (the group of transfer apparatuses 44a to 44d) connected to each other with communication routings in accordance with the external routing information notified from the external communication apparatus 50 outside the group of transfer apparatuses. Further, the transfer apparatus 44 has the internal routing layer L1 that serves as the internal control unit that performs autonomous decentralized control for autonomously constructing a routing for each of the transfer apparatuses in accordance with the internal routing information exchanged only between the transfer apparatuses in the group of transfer apparatuses. Features of the transfer apparatus 44 will be described.

(1) The transfer apparatus 44 has an internal RIB DB 45t that serves as the first DB that stores a destination address obtained by the internal routing layer L1 resolving the internal routing information through autonomous decentralized control and an external RIB DB 48t that serves as the second DB that stores the external routing information. Further, the transfer apparatus 44 has the transfer driver 63 and a transfer unit 52 that serve as transfer function units. The transfer unit 52 has the external port P3 to which the external routing information is input and the internal ports P1 and P2 to and from which the internal routing information is input and output, and transfers the external routing information input from the external port P3 and the internal routing information to other transfer apparatuses via the internal ports P1 and P2. Also, the transfer unit 52 has an internal RIB DB 46t that serves as the third DB that stores the external routing information or the internal routing information transferred from other transfer apparatuses.

Further, the transfer apparatus 44 includes the agent 65 that acquires, from the internal RIB DB 45t, the destination address of the external routing information input from the external port P3 and transfers the external routing information from the internal ports P1 and P2 to the transfer apparatus of the acquired destination address via the bridge 62.

The internal routing layer L1 performs control of detecting the destination address of the internal routing information from the internal RIB DB 45t, transferring the internal routing information to the transfer apparatus of the detected destination address, and storing the internal routing information or the external routing information transferred from other transfer apparatuses via the internal ports P1 and P2 in the internal RIB DB 46*t*.

The external routing layer L2 is configured to perform control of storing the external routing information transferred from the agent 65 in the external RIB DB 48*t*, storing the stored external routing information in the internal RIB DB 46*t* of the transfer apparatus to which the external routing layer L2 itself belongs, and transferring the external routing information to other transfer apparatuses via the internal ports P1 and P2.

According to this configuration, it is possible to individually process the internal routing information exchanged only between the transfer apparatuses and the external routing information input from the external port P3. During the processing, the agent 65 uses the destination address obtained by the internal routing layer L1 resolving the internal routing information in an autonomously decentralized manner (detecting the destination address) and stored in the internal RIB DB 45*t*. The destination address used here enables the transfer of the external routing information to the external routing layer L2 and storage thereof in the external RIB DB 48*t*. Further, the external routing layer L2 can store the external routing information, which is stored in the external RIB DB 48*t*, in the internal RIB DB 46*t* of the transfer apparatus to which the external routing layer L2 belongs, and can also transfer the external routing information such that the external routing information is stored in the internal RIB DBs 46*t* of other transfer apparatuses.

Thus, it is possible to transfer the external routing information input from the external port P3 to the external routing layer L2 that centrally controls the group of transfer apparatuses using the destination address resolved by the internal routing layer L1 in an autonomously decentralized manner. Thus, it is possible to resolve the internal routing by the internal routing layer L1 in an autonomously decentralized manner at the time of a failure in the internal routing or the transfer apparatus related to the internal routing information of the group of transfer apparatuses, and the transferring of the external routing information to the destination address is thus not affected. Further, according to the external routing layer L2, the internal routing layer L1 can solve the information related to the output destination of the transferred external routing information in an autonomously decentralized manner and transfer the information to the transfer apparatus to which the external routing layer L2 itself belongs and other transfer apparatuses, and the transfer processing is thus not affected by the failure. Thus, it is possible to reduce the amount of calculation load and a rerouting time for solving a failure at the time of a failure in the connection routings between the transfer apparatuses or in the transfer apparatuses.

(2) The internal RIB DB 46*t* individually stores, as destinations, the destination addresses of the transfer apparatuses related to the internal routing information and the destination addresses of the external communication apparatuses 50 and 50*b* related to the external routing information, and stores the IP table T1 as first information in which parameters are stored in an associated manner with each of the destinations and the output table T2 as second information in which parameters a stored in an associated manner with the destination addresses of the transfer apparatuses that are output destinations related to the internal routing information.

According to this configuration, because transferring cannot be performed via an internal routing or a transfer apparatus in which a failure has occurred in a case in which the failure has occurred in the internal routing between the transfer apparatuses or in the transfer apparatus, it is only necessary to delete only the destination address of the transfer apparatus that is the output destination via which the transferring cannot be performed according to the output table T2. This simple rewriting processing enables reflection of the deletion of the internal routing or the transfer apparatus in which the failure has occurred in the output table T2. In other words, it is possible to simply reflect a failure in the data tables at the time of a failure in an internal routing or in a transfer apparatus.

(3) The internal routing layer L1 includes the internal RIB DB 45*t*, the internal RIB 45, and the internal FIB 46. The internal RIB 45 performs resolution for detecting the destination address to which the internal routing information to be exchanged between the transfer apparatuses is to be transferred and stores, in the internal RIB DB 45*t*, the internal routing information with which the destination address obtained through the resolution is associated. The external FIB 49 reads the internal routing information, which is stored in the internal RIB DB 45*t*, with which the destination address is associated, and stores the internal routing information in the internal RIB DB 46*t*.

The external routing layer L2 includes the external RIB DB 48*t*, the external RIB 48, and the external FIB 49. When the external routing information is notified from the agent 65, the external RIB 48 performs resolution for detecting the destination address outside the group of transfer apparatuses related to the external routing information and the destination address inside the group of transfer apparatuses related to the internal routing information and stores the external routing information, with which all the destination addresses obtained through the resolution are associated, in the external RIB DB 48*t*. The external FIB 49 reads the external routing information, which is stored in the external RIB DB 48*t*, with which the destination addresses are associated, stores the read external routing information in the internal RIB DB 46*t*, and transfers the external routing information such that the external routing information is stored in the internal RIB DBs 46*t* of other transfer apparatuses.

According to this configuration, the internal routing layer L1 includes the internal RIB DB 45*t*, the internal RIB construction unit 45, and the internal FIB construction unit 46. Also, the external routing layer L2 includes the external RIB DB 48*t*, the external RIB construction unit 48, and the external FIB construction unit 49. Thus, it is possible to integrate each of the internal routing layer L1 and the external routing layer L2 in one unit.

(4) The external routing layer L2 is configured to be implemented in any one of the transfer apparatuses in the group of transfer apparatuses and be also implemented as a backup in any one of the transfer apparatuses other than the transfer apparatus in which the external routing layer L2 is implemented.

According to this configuration, it is possible to operate the external routing layer L2 as a backup when a failure occurs in a transfer apparatus in which the external routing layer L2 is operating or in an internal routing related to the transfer apparatus. It is thus possible to prevent a single point of failure at an integrated connection portion of the group of transfer apparatuses.

(5) The transfer system 40 is configured to include a group of transfer apparatuses, in which the transfer apparatuses 44 corresponding to any one of (1) to (4) above are connected to each other, and the external server 42 that is connected to the external routing layer L2 disposed in any one of the group of transfer apparatuses and centrally performs centralized control on the group of transfer apparatuses via the external routing layer L2.

According to this configuration, it is possible to centrally perform control such as routing construction on the group of transfer apparatuses through the centralized control performed by the external server 42 and thereby to resolve the routing information and perform routing without taking into consideration the number of transfer apparatuses at the time of a failure in an internal routing or on a transfer apparatus.

Modification Example of Embodiment

Figure 6:
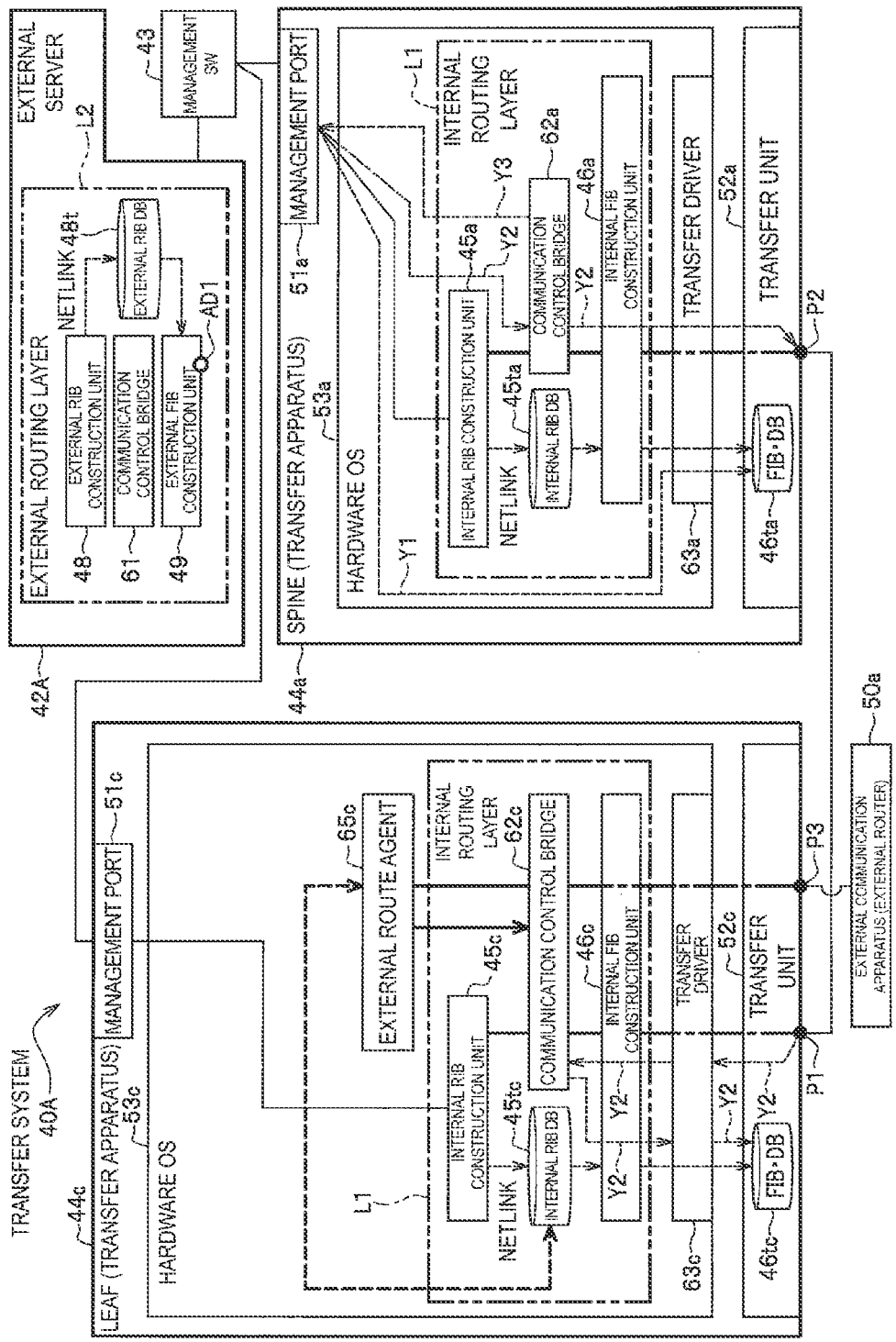
FIG. 6 is a block diagram illustrating a configuration of a transfer system using transfer apparatuses according to a modification example of the embodiment.

FIG. 6 is a block diagram illustrating a configuration of a transfer system using transfer apparatuses according to a modification example of the embodiment of the present invention.

A transfer system 40A illustrated in FIG. 6 is different from the transfer system 40 (FIG. 2) according to the aforementioned embodiment in that the transfer system 40A is configured such that the external server 42A is provided with the external routing layer L2 instead of the spine 44a including the external routing layer L2. In the case of this configuration, the external FIB 49 of the external server 42A is connected to the SW 43, and the management port 51a of the spine 44a is connected to the FIB DB 46ta, the internal RIB 45a, and the communication control bridge 62a. Also, the destination address to the external RIB 48 in the external routing layer L2 of the external server 42A is stored in the internal RIB DB 45tc of the leaf 44c.

In the transfer system 40A with this configuration, the external routing layer L2 of the external server 42A performs the processing of resolving the external routing that is equivalent to that in the aforementioned embodiment. In other words, if the external routing information input from the external port P3 of the leaf 44c is input to the agent 65c, the agent 65c accesses the internal RIB DB 45tc and acquires the destination address of the external routing information. The agent 65c encapsulates the external routing information and transfers the encapsulated external routing information to the acquired destination address.

The transferred capsule is notified from the internal FIB 46 of the spine 44a to the bridge 62a via the internal ports P1 and P2, is input to the port 51a as represented by the dashed-line arrow Y3, and is then input to the external FIB 49 of the external server 42A via the SW 43. The encapsulated information is decapsulated by the external FIB 49, and the external routing information after the decapsulation is transferred to the external RIB 48 via the bridge 61.

The external RIB 48 stores the transferred external routing information in the external RIB DB 48t. The stored external routing information is read by the external FIB 49 and is stored in the FIB DB 46ta of the transfer unit 52a via the SW 43 and the port 51a as represented by the dashed-line arrow Y1. With this storage, the external routing information from the external FIB 49 is output from the port 51a to the internal port P2 via the bridge 62a as represented by the dashed-line arrow Y2, is transferred from the internal port P2 to other transfer apparatuses 44b to 44d (the representative of which is the leaf 44c), and is stored in the FIB DB 46tc of the transfer unit 52c.

Also, a program executed by a computer according to the embodiment will be described. The computer includes the transfer apparatus 44 that has the external routing layer L2 that centrally controls a group of transfer apparatuses connected to each other with communication routings in accordance with external routing information notified from the external communication apparatuses 50 and 50b outside the group of transfer apparatuses and the internal routing layer L1 that performs autonomous decentralized control for autonomously constructing a routing for each of the transfer apparatuses in accordance with internal routing information exchanged only between the transfer apparatuses in the group of transfer apparatuses.

The program causes the computer to function as follows.

In other words, the program causes the computer to function as a unit that transfers the external routing information input from the external port P3 of the transfer apparatus 44 and the internal routing information to other transfer apparatuses 44 via the internal ports P1 and P2 of the transfer apparatus 44 and stores the external routing information or the internal routing information transferred from other transfer apparatuses 44 in the FIB DB 48t.

Also, the program causes the computer to function as a unit that acquires the destination address of the external routing information, which has been input from the external port P3, from the internal RIB DB 45t in which the destination address obtained by the internal routing layer L1 resolving the internal routing information through autonomous decentralized control is stored, and transfers the external routing information from the internal ports P1 and P2 to the transfer apparatus 44 of the acquired destination address.

Also, the program causes the computer to function as a unit that detects the destination address of the internal routing information that is a target of the transferring from the internal RIB DB 45t, transfers the internal routing information to the transfer apparatus 44 of the detected destination address, and stores the internal routing information or the external routing information, which has been transferred from other transfer apparatuses 44 via the internal ports P1 and P2, in the FIB DB 46t.

Further, the program causes the computer to function as a unit that stores the external routing information transferred from other transfer apparatuses 44 in the external RIB DB 48t, stores the stored external routing information in FIB DB 46t, and transfers the external routing information to other transfer apparatuses 44 via the internal ports P1 and P2.

According to this program, it is possible to obtain effects similar to those of the aforementioned transfer apparatus 44.

In addition, a specific configuration can be appropriately changed without departing from the gist of the present invention.

REFERENCE SIGNS LIST

40 Transfer system
42 External server
43 Management SW
44a to 44d Transfer apparatus
44a, 44b Spine
44c, 44d Leaf
45 Internal RIB construction unit
45ta, 45tc Internal RIB DB (first DB)
46 Internal FIB construction unit
46ta, 46tc FIB DB (third dB)
48, 48a External RIB construction unit
48ta External RIB DB (second DB)
49, 49a External FIB construction unit
50a. 50b External communication apparatus (external router)
51 Management port
52a, 52c Transfer unit
53a, 53c Hardware OS
61a, 62a, 62c Communication control bridge 63a. 63c Transfer driver
65c External route agent

The invention claimed is:

1. A first transfer apparatus comprising an internal port, an external port, and a central processing unit configured to execute a program that causes performance of operations comprising:
controlling a transfer apparatus group comprising a plurality of transfer apparatuses including the first transfer apparatus and one or more second transfer apparatuses, wherein the plurality of transfer apparatuses are connected to each other with communication routing in accordance with external routing information notified from an external communication apparatus outside the transfer apparatus group, wherein the external port is configured to receive the external routing information;
performing autonomous decentralized control for autonomously constructing routing for each of the plurality of transfer apparatuses in accordance with internal routing information exchanged only between the transfer apparatuses in the transfer apparatus group, wherein the internal port is configured to receive and output the internal routing information;
storing, in a first data base (DB), a destination address obtained by resolving the internal routing information through the autonomous decentralized control;
storing, in a second DB, the external routing information;
transferring the external routing information and the internal routing information to one of the second transfer apparatuses via the internal port, and storing, in a third DB, the external routing information or the internal routing information transferred from one of the second transfer apparatuses; and
acquiring, from the first DB, a destination address of the external routing information and transferring the external routing information via the internal port to one of the second transfer apparatuses that is designated by the acquired destination address;
wherein performing the autonomous decentralized control comprises performing control of (i) detecting a destination address of the internal routing information from the first DB, (ii) transferring the internal routing information to one of the second transfer apparatuses that is designated by the detected destination address, and (iii) storing, in the third DB, the internal routing information or the external routing information transferred from one of the transfer apparatuses via the internal port; and
wherein centrally controlling the transfer apparatus group comprises performing control of (i) storing the external routing information received by the internal port in the second DB, (ii) storing, in the third DB, the external routing information read from the second DB, and (iii) transferring the external routing information to one of the second transfer apparatuses via the internal port.

2. The first transfer apparatus according to claim 1, wherein the third DB individually stores, as destinations, a destination address of the transfer apparatus related to the internal routing information and a destination address of the external communication apparatus related to the external routing information and stores first information in which a parameter associated with each of the destinations is stored and second information in which a destination address of the transfer apparatus that is an output destination related to the internal routing information is stored, the destination address being associated with the parameter.

3. The first transfer apparatus according to claim 1, wherein performing the autonomous decentralized control comprises:
performing resolution for detecting a destination address to transfer the internal routing information to be exchanged between the transfer apparatuses and storing, in the first DB, the internal routing information with which the destination address obtained through the resolution is associated, and
reading the internal routing information, which is stored in the first DB and with which the destination address is associated, and storing the internal routing information in the third DB, and
wherein centrally controlling the transfer apparatus group comprises:
performing resolution for detecting a destination address outside the transfer apparatus group related to the external routing information and a destination address inside the transfer apparatus group related to the internal routing information and storing, in the second DB, the external routing information with which all the destination addresses obtained through the resolution are associated when the external routing information is notified via the internal port, and
reading the external routing information, which is stored in the second DB and with which the destination addresses are associated, storing the read external routing information in the third DB, and transferring the external routing information such that the external routing information is stored in the third DB of one of the second transfer apparatuses.

4. The first transfer apparatus according to claim 1, wherein one of the second transfer apparatuses is also configured to perform, as a backup, centrally controlling of the transfer apparatus group.

5. A transfer method performed by a first transfer apparatus, the method comprising:
centrally controlling a transfer apparatus group comprising a plurality of transfer apparatuses including the first transfer apparatus and one or more second transfer apparatuses, wherein the plurality of transfer apparatuses are connected to each other with communication routing in accordance with external routing information notified from an external communication apparatus outside the transfer apparatus group, wherein an external port of the first transfer apparatus is configured to receive the external routing information;
performing autonomous decentralized control for autonomously constructing routing for each of the plurality of transfer apparatuses in accordance with internal routing information exchanged only between the transfer apparatuses in the transfer apparatus group, wherein an internal port of the transfer apparatus is configured to receive and output the internal routing information;
storing, in a first data base (DB), a destination address obtained by resolving the internal routing information through the autonomous decentralized control;
storing, in a second DB, the external routing information;
transferring the external routing information and the internal routing information to one of the second transfer apparatuses via the internal port, and storing, in a third DB, the external routing information or the internal routing information transferred from one of the second transfer apparatuses; and
acquiring, from the first DB, a destination address of the external routing information and transferring the external routing information via the internal port to one of the second transfer apparatuses that is designated by the acquired destination address;

wherein performing the autonomous decentralized control comprises performing control of (i) detecting a destination address of the internal routing information from the first DB, (ii) transferring the internal routing information to one of the second transfer apparatuses that is designated by the detected destination address, and (iii) storing, in the third DB, the internal routing information or the external routing information transferred from one of the transfer apparatuses via the internal port; and wherein centrally controlling the transfer apparatus group comprises performing control of (i) storing the external routing information received by the internal port in the second DB, (ii) storing, in the third DB, the external routing information read from the second DB, and (iii) transferring the external routing information to one of the second transfer apparatuses via the internal port.

6. A non-transitory computer readable medium storing a program that causes a computer to operate as a first transfer apparatus by performing operations comprising:

centrally controlling a transfer apparatus group comprising a plurality of transfer apparatuses including the first transfer apparatus and one or more second transfer apparatuses, wherein the plurality of transfer apparatuses are connected to each other with communication routing in accordance with external routing information notified from an external communication apparatus outside the transfer apparatus group, wherein an external port of the first transfer apparatus is configured to receive the external routing information;

performing autonomous decentralized control for autonomously constructing routing for each of the plurality of transfer apparatuses in accordance with internal routing information exchanged only between the transfer apparatuses in the transfer apparatus group, wherein an internal port of the first transfer apparatus is configured to receive and output the internal routing information;

storing, in a first data base (DB), a destination address obtained by resolving the internal routing information through the autonomous decentralized control;

storing, in a second DB, the external routing information;

transferring the external routing information and the internal routing information to one of the second transfer apparatuses via the internal port, and storing, in a third DB, the external routing information or the internal routing information transferred from one of the second transfer apparatuses; and acquiring, from the first DB, a destination address of the external routing information and transferring the external routing information via the internal port to one of the second transfer apparatuses that is designated by the acquired destination address;

wherein performing the autonomous decentralized control comprises performing control of (i) detecting a destination address of the internal routing information from the first DB, (ii) transferring the internal routing information to one of the second transfer apparatuses that is designated by the detected destination address, and (iii) storing, in the third DB, the internal routing information or the external routing information transferred from one of the transfer apparatuses via the internal port; and wherein centrally controlling the transfer apparatus group comprises performing control of (i) storing the external routing information received by the internal port in the second DB, (ii) storing, in the third DB, the external routing information read from the second DB, and (iii) transferring the external routing information to one of the second transfer apparatuses via the internal port.

* * * * *